United States Patent
Levy et al.

(10) Patent No.: US 8,391,291 B2
(45) Date of Patent: Mar. 5, 2013

(54) LEARNING THE EXPIRY TIME OF AN ADDRESS BINDING WITHIN AN ADDRESS TRANSLATION DEVICE FOR AN SIP SIGNALING SERVER

(75) Inventors: Thomas Levy, Paris (FR); Gaelle Jaupitre, Paris (FR)

(73) Assignee: Alcatel Lucent, Paris (FR)

( * ) Notice: Subject to any disclaimer, the term of this patent is extended or adjusted under 35 U.S.C. 154(b) by 1041 days.

(21) Appl. No.: 12/224,870

(22) PCT Filed: Mar. 21, 2007

(86) PCT No.: PCT/FR2007/050972
§ 371 (c)(1),
(2), (4) Date: Jan. 8, 2009

(87) PCT Pub. No.: WO2007/113426
PCT Pub. Date: Oct. 11, 2007

(65) Prior Publication Data
US 2009/0201913 A1    Aug. 13, 2009

(30) Foreign Application Priority Data
Mar. 30, 2006  (EP) .................................... 06300303

(51) Int. Cl.
*H04L 12/56* (2006.01)
(52) U.S. Cl. .............. 370/395.2; 370/395.21; 370/395.3
(58) Field of Classification Search ........................ None
See application file for complete search history.

(56) References Cited

U.S. PATENT DOCUMENTS

| 6,832,322 | B1 * | 12/2004 | Boden et al. ..................... 726/15 |
| 2005/0100001 | A1 * | 5/2005 | Liu ............................... 370/352 |
| 2005/0286519 | A1 | 12/2005 | Ravikumar et al. |
| 2006/0268890 | A1 * | 11/2006 | Richardson et al. ....... 370/395.3 |
| 2007/0019545 | A1 * | 1/2007 | Alt et al. ....................... 370/230 |

OTHER PUBLICATIONS

Rosenberg et al., "RFC 3261:SIP: Session Initiation Protocol", Jun. 2002.*
Donovan and Rosenberg, "RFC 4028: Session Timers in the Session Initiation Protocol (SIP)", Apr. 2005.*
Rosenberg J Weinberger Dynamicsoft C Huitema Microsoft R Mahy Ciso J: "STUN—Simple Traversal of User Datagram Protocol (UDP) Through Network Address Translators (NATs); rfc3489.txt;" IETF Standard, Internet Engineering Task Force, IETF, CH, Mar. 2003. XP015009272 ISSN: 0000-0003; figure 1, p. 41, line 9-13.

* cited by examiner

*Primary Examiner* — Andrew Chriss
*Assistant Examiner* — Salvador E Rivas
(74) *Attorney, Agent, or Firm* — Harness, Dickey & Pierce

(57) ABSTRACT

A signaling server (SS) comprising means for transmitting SIP signaling messages with a client (T) through a NAT address translation device temporarily binding a public address to the client's private address, including means for receiving registration messages from the client and for sending the client a validity duration, at the end of which it must transmit a new registration message. The invention resides in the fact that if the client is located behind an address translation device, it determines an approximate expiry time for the temporary binding by successively sending test messages after an increasing wait time until the termination of the binding is detected. This approximate time is then used by being transmitted as the SIP validity period.

8 Claims, 2 Drawing Sheets

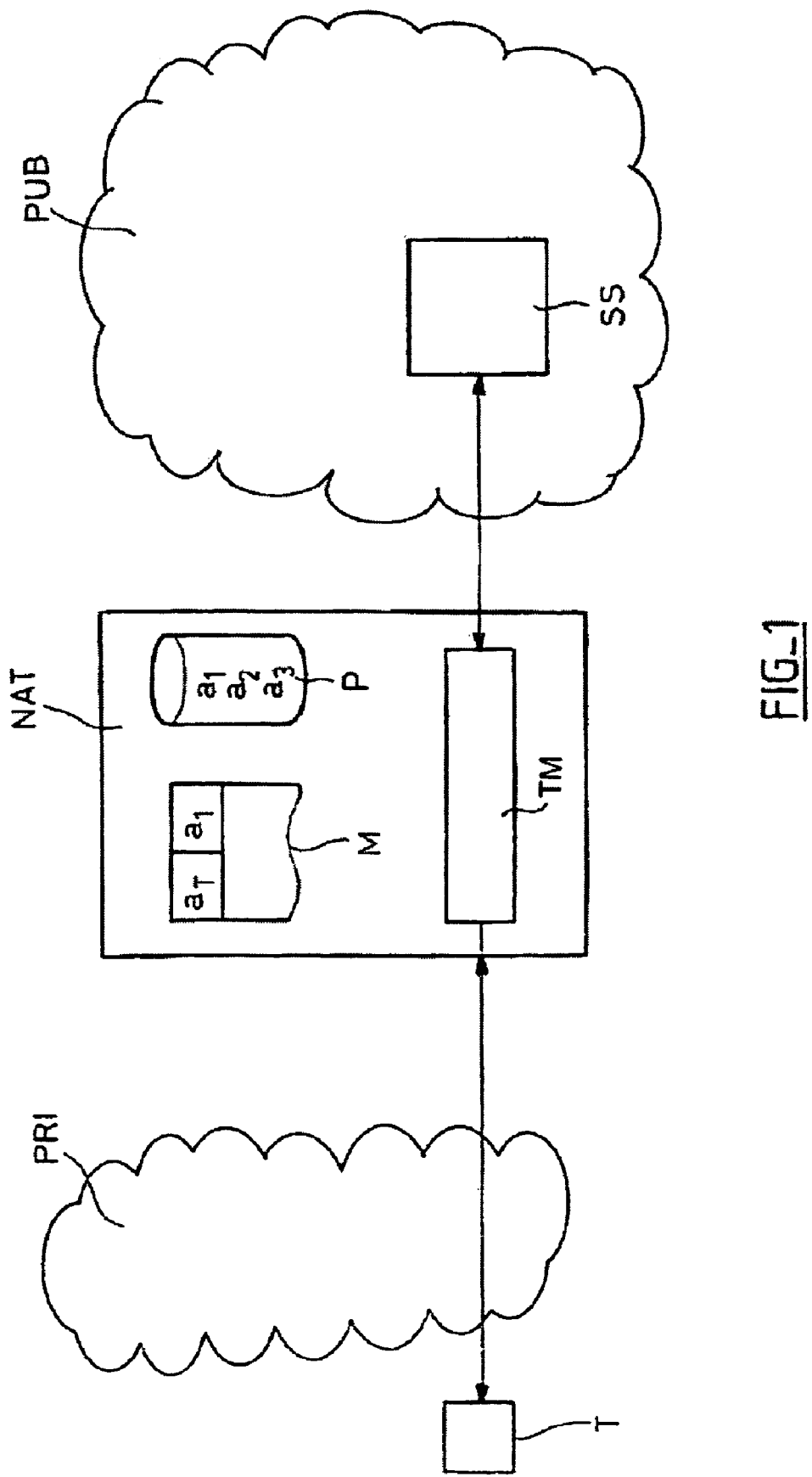
FIG_1

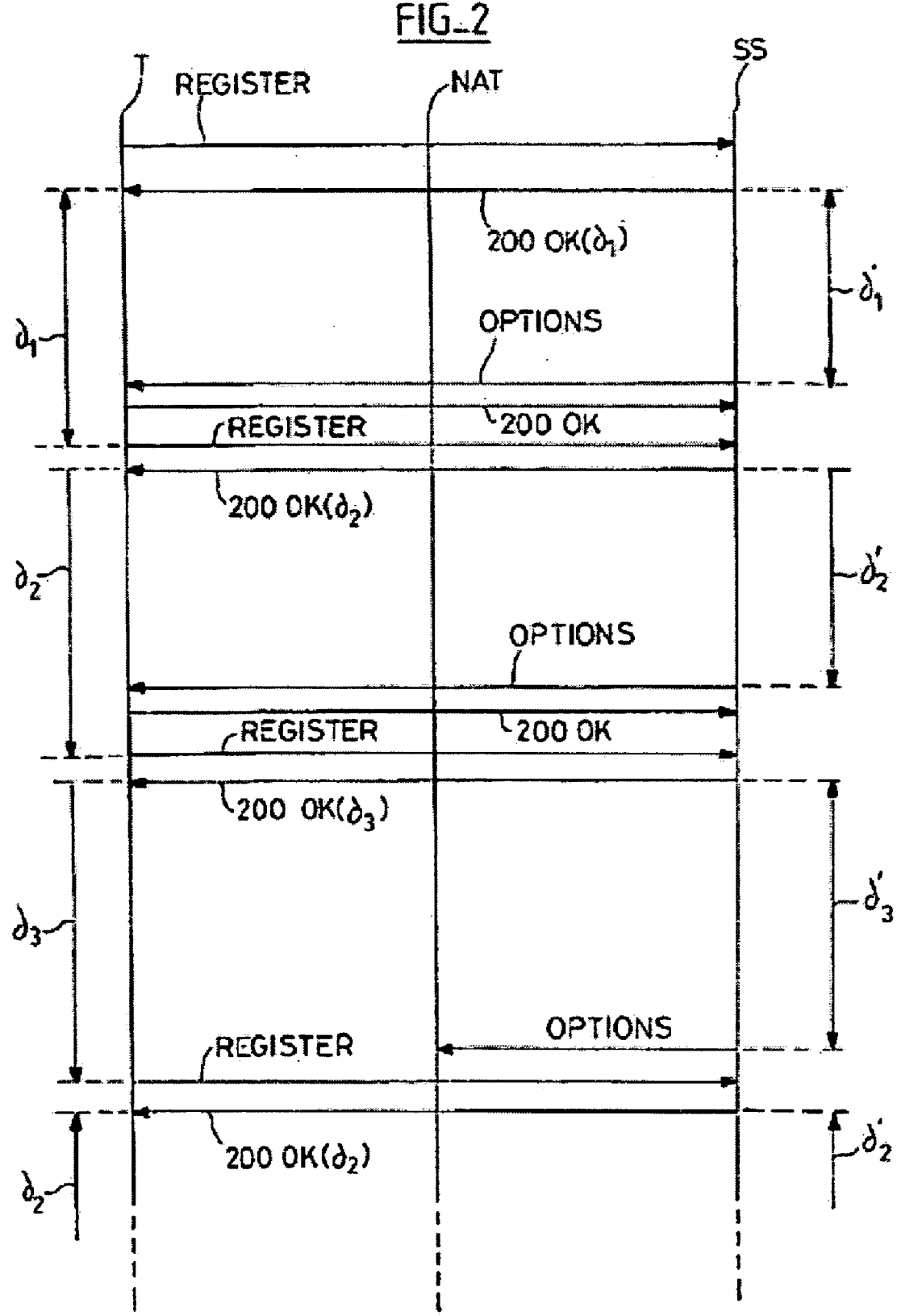

LEARNING THE EXPIRY TIME OF AN ADDRESS BINDING WITHIN AN ADDRESS TRANSLATION DEVICE FOR AN SIP SIGNALING SERVER

The present invention pertains to the transmission of multimedia streams by a data communication network. In particular, it applies to IP (Internet Protocol) telephony, to IP videophone service, etc.

These applications most commonly require a session to be established between the parties. These parties are most commonly multimedia terminals such as telecommunication terminals (GSM or UMTS terminals, etc.), personal digital assistants (PDAs), computers, etc.

This session is established by a so-called "calling" party, which "invites" other parties to join the session. The invitations, as well as other signaling messages, are normally carried by a signaling protocol such as the SIP (Session Initiation Protocol) protocol defined by RFC 3261 of the IETF (Internet Engineering Task Force).

These SIP signaling messages are transmitted over the communication network with the assistance of signaling servers, commonly known as "proxy servers". The main purpose of these signaling servers is to interpret the addresses contained within the signaling messages in order to send them to the receiving party.

In order for the signaling servers to have sufficient knowledge of the communication network, the terminals must be registered with their signaling server. In this manner, each signaling server knows which terminals are connected to it, and which signaling messages (and calls) may be suitably transmitted over the communication network. Such a registration is typically performed by the SIP protocol's "Register" registration message.

This protocol also includes a message called "Invite", which allows the calling party to initiate a session with the called party.

The global communication network (commonly called "the Internet") may be seen as a connection between private communication networks. These private networks may, for example, be enterprise communication networks. They are connected together via one or more communication networks administered by communications operators.

Quite often, the private networks and the public network are connected by an address translation device, known as NAT (Network Address Translation) devices and described in RFC 3022 of the IETF. The purpose of such a device is to bind the public addresses, which are only used within the private network, to public addresses, which are used within the public network.

Among these NAT devices, address and port translation devices (NAPT devices, for "Network Address and Port Translation") also exist, which, in addition to the IP addresses, also take into consideration the ports indicated in the IP packets. In the following description, to make reading easier, the acronym NAT will be considered to also encompass NAPT devices or other similar devices: Two-way NAT devices, NAPT redirect/port forwarding devices, Twice-NAT devices, etc.

Also for the sake of clarity, we will use the term "coordinates" to refer to all information contained within the IP packets which are used by a NAT device to identify a piece of equipment or an application (IP addresses, ports, etc.)

The address translation device has access to a pool of public addresses, which normally are much fewer in number than the terminals connected to the private network. Whenever one of these terminals wishes to access the public network, the NAT address translation device assigns it a public address from among those still available in its pool of public addresses.

A NAPT (Network Address and Port Translation) may use the same public address for multiple private addresses. In such a case, the binding is performed based not only on IP addresses, but also on the ports used or other information (protocols, etc.). This binding of private and public coordinates is temporary. From the viewpoint of the public network, this terminal then possesses the public coordinates assigned by the NAT (or NAPT, etc.) address translation device, and its private coordinates are then transparent for the public network.

This binding is necessarily temporary, so as not to monopolize the public addresses found in the set of public addresses. Additionally, after a certain period of non-usage has passed, the binding is terminated and the assigned public address once again becomes available to be newly reassigned.

This non-usage may, for example, occur whenever a TCP (Transport Communication Protocol) connection is terminated between the parties on both sides of a NAT address translation device. Once it has been terminated, and after this period of time, known as the expiry time, has lapsed, the binding is terminated, and if the two parties wish to communicate again, they will need to be newly bound. This aspect of the functioning of an address translation device is explained, for example, in the document "NAT Behavioural Requirements of Unicast UDP", published in September 2005 and available on the IETF's website.

A problem arises with the SIP protocol. SIP is based on the lower-level protocol known as UDP (User Datagram Protocol), which, unlike TCP, does not involve the establishment of an end-to-end connection between the parties. With the use of the TCP protocol, a positive action from one of the parties is therefore needed in order to interrupt the TCP connection so that the binding is terminated within the NAT address translation device. However, with the usage of the UDP protocol, the binding may be terminated without any positive action, simply by not sending data packets for a period of time equal to or greater than the expiry time.

The applicant has noted that this will pose an increasing problem with the growing use of the SIP protocol to establish multimedia sessions.

As this SIP protocol is based on UDP, the absence or insufficiency of signaling traffic during a multimedia session causes the session to be interrupted by terminating the NAT address translation device's binding.

Currently, this problem is partially solved by manually setting the validity period of the SIP protocol's signaling messages, so that the clients periodically re-register after a period less than the expiry time of the NAT address translation device. Indeed, the SIP protocol provides that the clients only temporarily register with a signaling server. The "Register" registration message therefore includes a parameter making it possible to specify the validity period at the end of which the signaling server will close its "connection" with the client.

Additionally, if the client wishes to remain constantly connected to the signaling server, and accessible by the entire communication network, it must periodically re-send "Register" registration messages.

This validity period is normally negotiated between the client and the signaling server, but it may also be set manually by the operator.

This validity period for SIP signaling messages may be set to a deliberately short value, in order to guarantee the non-termination of the binding of the NAT address translation device.

The operator may also rely upon the manufacturer's data for the NAT address translation device, or conduct a statistical study, in order to determine the most optimal value for the validity period that best corresponds to this device's expiry time.

However, these methods suffer from serious drawbacks.

Firstly, they require that the operator intervene manually. This is a costly task for the operator, and may cause configuration errors. For example, if the address translation device is changed, the operator must remember to change the value of the validity period accordingly.

Furthermore, choosing too low a value for the validity period of the SIP signaling messages overloads the communication network by sending too many "Register" registration messages.

These problems are fairly minor today, but the applicant believes that they will become more critical as the usage of the SIP protocol for establishing multimedia sessions grows.

The present invention proposes to resolve these problems, by adjusting the signaling server so that it automatically determines an optimal value for the address translation device's expiry time, and so that it applies this value as the validity period of the SIP protocol's "Register" registration messages.

More precisely, the objects of the invention are a signaling server comprising means for transmitting SIP signaling messages with a client through a NAT address translation device temporarily binding a public address with said client's private address. This server includes means for receiving registration messages coming from said client, and for sending it a validity period at the end of which it must transmit a new registration message to the signaling server.

According to the invention, this signaling server is characterized in that it has:
  means for detecting whether the client is located behind a NAT address translation device, and
  if so, for determining the approximate expiry time of the temporary binding by successively sending test messages after an increasing wait time until the termination of said binding is detected, and
  means for, upon the completion of this determination, transmitting the approximate expiry time to the client as the validity period.

In this manner, the automatic determination makes it possible to avoid using a human operator, and to reduce both costs and error source. It also enables a better optimization of the validity period, enabling the ideal compromise between the non-termination of the binding of the address translation device and the load of the communication network.

In one implementation of the invention, during a learning phase, the messages replying to the registration messages contain a validity period slightly greater than the time to wait before the first test message is sent.

In one embodiment of the invention, the learning phase ends whenever a test message receives no reply.

In one embodiment, the test messages are "Options" messages.

Finally, the reply messages may be "200 Ok" messages, and the validity periods may be contained within an "Expires" field of these messages, or within an "Expires" parameter of a "Contacts" field of these messages.

Another object of the invention is a method for connecting a signaling server to a client through an address translation device temporarily binding a public address to the client's private address, consisting of transmitting registration messages from the client to the signaling server, and sending the client a validity period at the end of which it must transmit a new registration message to the signaling server. This method is characterized in that it further comprises
  a step of the signaling server detecting whether the client is located behind an address translation device; and
  if this is the case, a learning step, consisting of determining the approximate expiry time of said temporary binding by successively sending test messages after an increasing wait time until the termination of said binding is detected, and
  a step of usage, upon the completion of this determination, consisting of transmitting said approximate expiry time to the client as a validity period.

The invention and its advantages will become more clearly apparent in the following description, with reference to the attached figures:

FIG. 1 diagrams the general architecture within which the signaling server is found, according to the invention.

FIG. 2 depicts the flows of exchanges between the multiple parties to the communication, according to the invention.

As indicated above, the invention operates within a multimedia session established between a terminal T, located within a private network PRI and a located second terminal, not depicted. The word "terminal" refers to any communication device enabling the establishment of a multimedia session, i.e. voice over IP, videophone services, etc. It may, for example, be a mobile terminal compliant with the UMTS (Universal Mobile Telecommunications System) or GPRS (Global Packet Radio System) standards, or a personal digital assistant (PDA), a microcomputer, a device such as those sold by the company Blackberry™, etc.

In the jargon of the SIP protocol, these terminals are considered clients. In the following description, the terms "client" and "terminal" will be considered equivalent.

This second terminal (or client) is typically connected to another private network, also not depicted. In a multiparty conference call, multiple other terminals may be parties to the multimedia session.

The public network PUB includes a signaling server SS which enables the routing of the signaling messages exchanged between the parties.

FIG. 1 essentially illustrates the part of the architecture of the communication networks which connect this signaling server SS and a communication terminal T.

The two communication networks PRI and PUB are connected to one another by (at least) one address translation device NAT. The signaling messages exchanged between the terminal T and the signaling server SS are therefore transmitted through this address translation device NAT.

Within the private network PRI, the terminals and nodes have addresses which are assigned independently of the global network. In other words, there is no guarantee undertaken to tell whether an address has already been assigned somewhere else in the world. The purpose of the address translation device NAT is to isolate the private network PRI, by making it so that the private addresses are never used in communication with the public network PUB.

The NAT address translation device has a pool P of public addresses available $a_1$, $a_2$, $a_3$. These addresses, which may be used throughout the entire public network, are provided by the IANA (Internet Assigned Numbers Authority), the organization in charge of creating address maps and uniquely assigning public addresses within the public network.

Whenever the terminal T wishes to communicate outside of the private network PRI, and the signaling server SS assigns it one of the available addresses $a_1$ from among the pool P of public addresses, as well as a port for an NAPT device. This binding is saved in a lookup table M (for "Map").

Furthermore, the address translation device has translation means TM for translating the fields of the IP addresses related to the coordinates of terminal T in both directions, and to adjust the checksum fields accordingly. In this manner, the packets coming from the terminal T, when output from the address translation device NAT, will have source addresses $a_1$. Conversely, the packets coming from the signaling server SS and being sent to said terminal T will have destination addresses $a_1$; the only one which is known to this server. The translation means TM of the address translation device NAT then use the lookup table M to edit the fields so that the packets are then output through the interface of the private network PRI with the private address $a_T$ as their destination address. These packets may then be correctly routed within the private network PRI to the destination terminal T.

The address translation device NAT further possesses a timer enabling it to measure for how long a binding has not been used. Upon the expiration of this expiry time, the binding ends.

FIG. 2 depicts the flows of signaling messages between the parties to the communication. This figure possesses a downward-oriented temporal axis. Each vertical line is representative of a network element: the leftmost line represents the terminal T, the middle line represents the address translation device NAT, and the right line the signaling server SS.

The horizontal arrows represent the signaling messages. As we will see later on, these signaling messages may be of various natures: "Register" registration messages, "Options" test messages, "200 Ok" reply messages, etc, and other types not used in the invention. From a vocabulary standpoint, it is important to note that the "Options" signaling message is not generally a test message: it holds this meaning only within the present invention.

The first message is a registration message. In the SIP protocol, it may be a "Register" message, as described in paragraph 10 of the abovementioned RFC 3261.

This message enables the terminal T to make itself known to the signaling server SS so that said server can integrate it into its information base that combines all terminals (more generally "SIP clients") known to said signaling server SS.

This message includes a header comprising a set of mandatory fields. As indicated in paragraph 8.1 of RFC 3261, an SIP message must include at least the following fields: "To", "From", "CSeq", "Call-ID" "Max-Forwards", and "Via". Furthermore, a "Contact" field may be incorporated into the "Register" registration message. The information contained within RFC 3261 relating to the SIP protocol's message fields are known to a person having ordinary skill in the art.

The SIP protocol provides that a validity period for the "Register" registration message to be indicated within this message. It offers two ways to specify this information:
 the validity period may be indicated within an additional field known as "Expires", described in paragraph 20.19 of RFC 3261;
 the validity period may be indicated within an "Express" parameter in the "Contact" field, as specified in sections 10.2 and 20.10 of said RFC 3261.

By default, the SIP clients (i.e. the terminal T) do not offer a validity period.

Upon receiving this "Register" registration message, the signaling server SS analyzes the fields of the message, and may determine whether or not the sending terminal T is located behind an address translation device NAT. This determination may, for example, be made by analyzing the content of the "Via" field of the header.

As explained in paragraph 8.1.1.7 of RFC 3261, the "Via" field indicates the network nodes through which the message is transmitted. By analyzing the "Via" field(s), it is entirely possible to determine whether a registration message has passed through an address translation device NAT, and even to tell its address.

If the signaling server SS detects that the client T is located behind an address translation device NAT, a phase of learning an optimal validity period is initiated.

To do so, the signaling server determines an approximate expiry time for the binding by successively sending test messages after an increasing wait time until the termination of the binding is detected.

First, the signaling server SS replies to the registration message with a "200 Ok" replay message specified in the SIP protocol by RFC 3261. This reply message includes a validity period set to a first value $d_1$. This first value $d_1$ is set in such a way as to be lower than the expiry time of the binding of the address translation device NAT. This value, therefore, is deliberately not very high, e.g. on the order of 15 seconds.

As with the "Register" registration message, the "200 Ok" reply message may contain the value $d_1$ in (at least) two different places, opening the possibility for two embodiments of the invention:
 In a first embodiment, the validity period is transmitted in the "Expires" field of the "200 Ok" reply message.
 In a second embodiment, the validity period is indicated in an "Expires" parameter of the "Contact" field.

The client T is therefore instructed by this "200 Ok" reply message that it must re-send a "Register" registration message at the end of a period $d_1$.

In parallel, the signaling server SS waits for a period of time $d_1'$ slightly shorter than the first validity period $d_1$ before sending a test message to the client T.

More generally, throughout the learning phase, the reply messages to the registration messages contain a validity period slightly longer than the time to wait before sending the next test message.

This test message is meant to check whether or not the address binding within the address translation device NAT is still active.

It may be implemented by the "Options" message of the SIP protocol, which allows one party to request the capabilities of another party.

An "Options" message includes the same fields as a "Register" registration message. It may also have a "Contact" field.

If the binding between the public and private addresses of the client T is still active within the address translation device NAT, the test message is transmitted to the client T. When it is received, the client T sends back a "200 OK" reply message which, in turn, travels through the address translation device NAT before reaching the signaling server SS. The signaling server SS is then informed that the binding is still active within the address translation device NAT. It may then deduce from this information whether the binding's expiry time is greater than the wait period $d_1'$.

It may then test a higher value for this period.

In reply to the second "Register" registration message, the signaling server SS replies with a "200 Ok" reply message containing a validity period set to a second value $d_2$, greater than the first value $d_1$.

In parallel, the signaling server SS waits for a period of time $d_2'$ slightly shorter than the second validity period $d_2$ before sending a test message to the client T, such as an "Options" message.

As before, if the binding is still active within the address translation device NAT, the signaling server receives a "200 Ok" reply message to its test message.

It can once again increment the values of the periods of time, known that the expiry time of the address translation device NAT is therefore still greater than the wait period $d_2'$.

Upon receiving the third "Register" registration message, the signaling server SS thus replies with a "200 Ok" reply message containing a validity period set to a third value $d_3$, greater than the second value $d_2$.

In parallel, the signaling server SS waits for a period of time $d_3'$ slightly shorter than the third validity period $d_3$ before sending a test message to the client T, such as an "Options" message.

In the example depicted in FIG. 2, it is assumed that this third period is greater than the expiry time of the address processing device NAT. When this is true, the device cannot transmit the "Options" test message to the client T. Consequently, the signaling server SS never receives any "200 Ok" reply message.

Nevertheless, at the end of the validity period $d_3$, the terminal T transmits a "Register" registration message, which creates a new public address/private address binding within the NAT address translation device. This "Register" registration message is then transmitted through the address translation device NAT to the signaling server SS Whenever it receives said "Register" registration message, the signaling server determines that because it did not receive any "200 Ok" reply message to its "Options" test message, the expiry time of the address translation device NAT is less than the last value tested $d_3'$. More precisely, it may determine that the approximate value for this expiry time is between the value $d_2'$ and the value $d_3'$.

Numerical Examples

The periods of time used may be those found in the following table:

| | |
|---|---|
| $d_1$ = 15 seconds | $d_1'$ = 10 seconds |
| $d_2$ = 25 seconds | $d_2'$ = 20 seconds |
| $d_3$ = 35 seconds | $d_3'$ = 30 seconds |
| $d_4$ = 45 seconds | $d_4'$ = 40 seconds |

In this example, the increment between two consecutive values is 10 seconds. However, this is only an example, and it remains entirely possible to use other numerical values.

In a first embodiment of the invention, the learning phase ends when a test message has received no reply. The signaling server SS may then assume that the preceding value $d_2$ is the optimal value for the validity period of "Register" registration messages, and use it afterwards. It then replies to the "Register" registration message with the value $d_2$.

It will reply with this value to any new "Register" message coming from the same terminal T, in a usage step.

Likewise, it may use this same value $d_2$ with any new terminal located behind the same address translation device NAT without triggering a phase of learning the expiry time. In this embodiment, the signaling server SS therefore has a table enabling it to associate an approximate expiry time to any address management device NAT. This embodiment makes it possible to bypass phases for learning these times-to-expire, and to go directly to a usage step, and therefore to save network resources by reducing the number of messages which are exchanged during the learning step.

In a second embodiment of the invention, the signaling server may seek to further optimize the approximate value to use as the validity period of "Register" registration messages. It can then proceed dichotomously and test the wait period and intervening validity period, until it obtains a sufficient approximation of the expiry time of the address translation device NAT. Only then does it move to the usage step, when the value thereby determined is used in its exchange with the client.

According to the invention, there is therefore a lapse of time during which the terminal T is not accessible over the communication network. Indeed, once the test message includes a value greater than the expiry time of the address translation device, the terminal T is inaccessible until the next "Register" registration message. In this manner, if an "Invite" invitation message arrives at the signaling server intended for the client T, it will not even require a reply, because, at that precise moment, it is no longer connected to the client T.

This lapse of time, however, is negligible if the increments between two consecutive values $d_i/d_i+1$ are sufficiently low.

However, it may be provided for that in the event of a call to this client T during this lapse of time, the signaling server re-routes this call to a voice server, informing the caller that the client T will be available in a few seconds.

The invention may also apply to a STUN server, as defined by RFC 3489 of the IETF, entitled "STUN—Simple Traversal of User Datagram Protocol".

Indeed, for this sort of server used to solve the general problem of crossing the NAT or NATP device, the same particular problem of automatically determining an optimal value of the expiry time of the address translation device arises.

Additionally, a STUN server may include a signaling server according to the present invention.

The invention claimed is:

1. A signaling server comprising:
a transmitter configured to transmit SIP signaling messages to a client through an address translation device temporarily binding a public address to the private address of said client,
a receiver configured to receive registration messages from said client, and the transmitter sending said client reply messages containing a validity period at the end of which said client must transmit a new registration message to said signaling server,
a detector configured to detect whether said client is located behind a given address translation device, and if this is the case, the signaling server determines an approximate expiry time of said temporary binding by successively sending test messages after an increasing wait period until the termination of said binding is detected, wherein, the transmitter transmits the approximate expiry time to said client as the validity period.

2. A signaling server according to claim 1, wherein, during a learning phase, the validity period contained in the reply messages to the registration messages is slightly greater than the time to wait before sending the next test message.

3. A signaling server according to claim 2, wherein the learning phase ends when the signaling server in response to a test message has received no reply.

4. A signaling server according to claim 3, wherein said test messages are "Options" messages.

5. A signaling server according to claim 1, wherein the reply messages for the registration messages are "200 Ok" messages; said validity periods being contained within an "Expires" field, or in an "Expires" parameter of a "Contacts" field of said reply messages.

6. A signaling server according to the preceding claim 1, further comprising:
a table associating each address translation device with an approximate expiry time so that, when the signaling server detects that a given client is located behind a given address translation device, the signaling server directly uses the approximate expiry time associated with said given address translation device in said table.

7. A STUN server comprising a signaling server according to claim 1.

8. A method for connecting a signaling server to a client through an address translation device temporarily binding a public address to said client's private address, comprising:

receiving registration messages from said client at said signaling server, transmitting to said client a validity period at the end of which said client must transmit a new registration message to said signaling server wherein if said client is located behind an address translation device (NAT) then, determining the validity period of said temporary binding by successively sending test messages after an increasing wait period until the termination of said binding is detected, and transmitting said validity period to said client.

\* \* \* \* \*